Dec. 13, 1966 G. TOMELLERI 3,291,172
STONING MACHINE FOR CHERRIES AND THE LIKE
Filed Nov. 29, 1963 3 Sheets-Sheet 1

INVENTOR
Giordano Tomelleri
BY Shoemaker and Mattare
ATTORNEYS

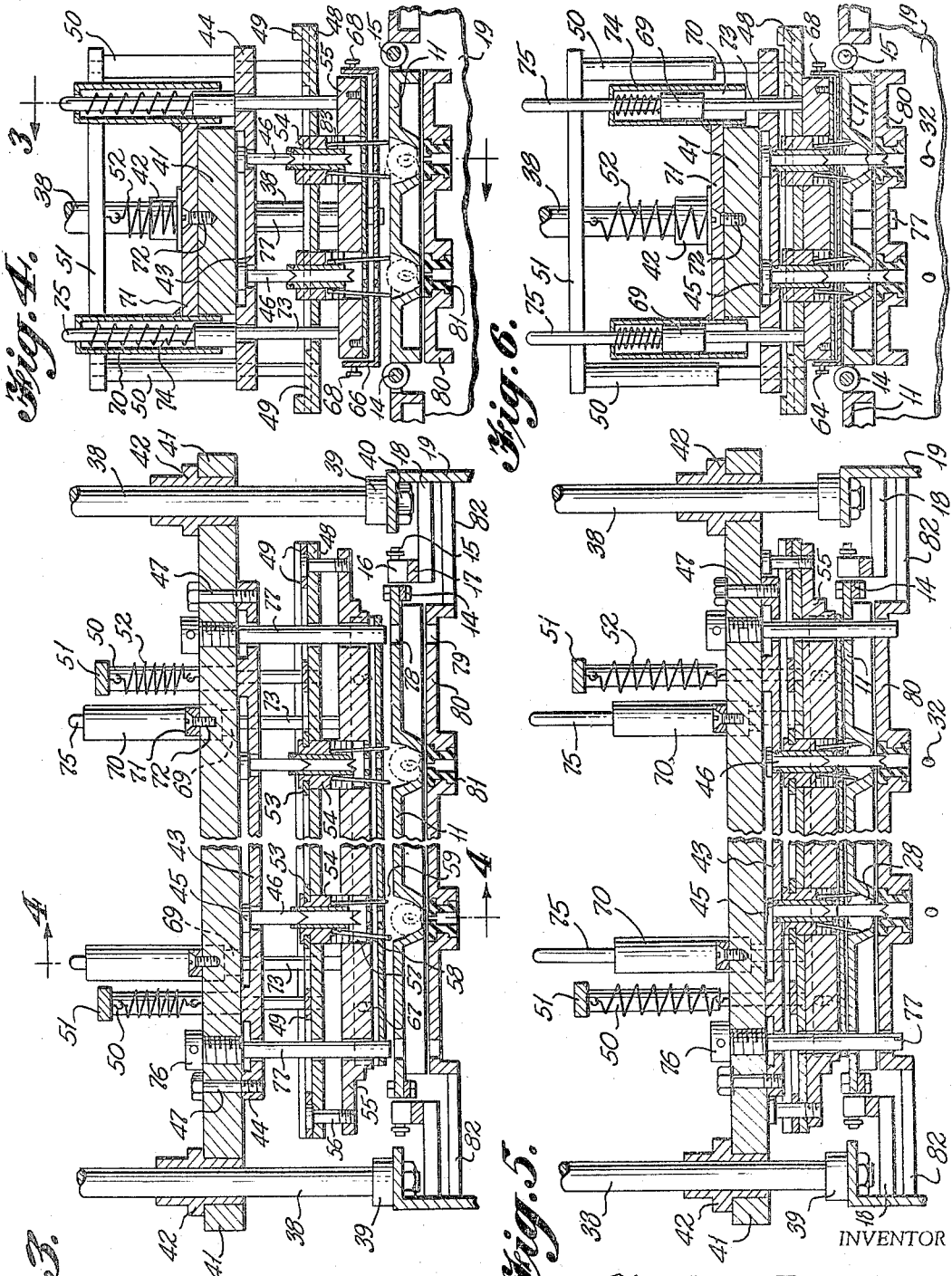

Dec. 13, 1966 G. TOMELLERI 3,291,172
STONING MACHINE FOR CHERRIES AND THE LIKE
Filed Nov. 29, 1963 3 Sheets-Sheet 3

INVENTOR
Giordano Tomelleri

BY Shoemaker and Mattare
ATTORNEYS

United States Patent Office 3,291,172
Patented Dec. 13, 1966

3,291,172
STONING MACHINE FOR CHERRIES AND THE LIKE
Giordano Tomelleri, 22 Via Montorio, Verona, Italy
Filed Nov. 29, 1963, Ser. No. 326,766
Claims priority, application Italy, Dec. 4, 1962, 24,196/62
5 Claims. (Cl. 146—19)

The invention relates to stoning machines for cherries and the like and aims to provide a machine which permits the mechanical removal of the stones even from small cherries and yet with negligible pulp loss.

It is a further aim of the invention to provide a machine which permits the mechanical removal of the stones from cherries and the like even if the fruit is not ideally positioned.

Further aims of the invention will become apparent from the following description with reference to the accompanying drawings which are by way of example and wherein:

FIG. 3 is a vertical cross-section through the head in the inoperative condition thereof, taken along the line 3—3 in FIG. 2, with the central portion of the head having been removed;

FIG. 4 is a vertical cross-section through the head in the inoperative condition thereof, at right angles to the cross-section of FIG. 3 and taken along the line 4—4 of FIG. 3;

FIGS. 5 and 6 are cross-sections respectively analogous to those of FIGS. 3 and 4 but with the head in the operative position;

Figure 1:
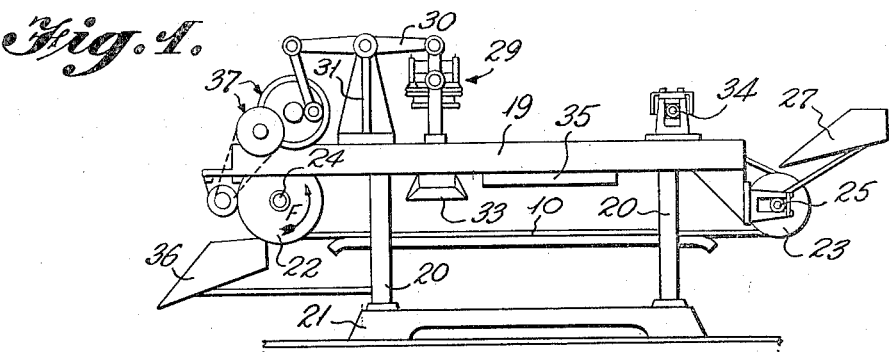
FIG. 1 is a diagrammatic lateral elevation of the stoning machine of the invention.
Figure 2:
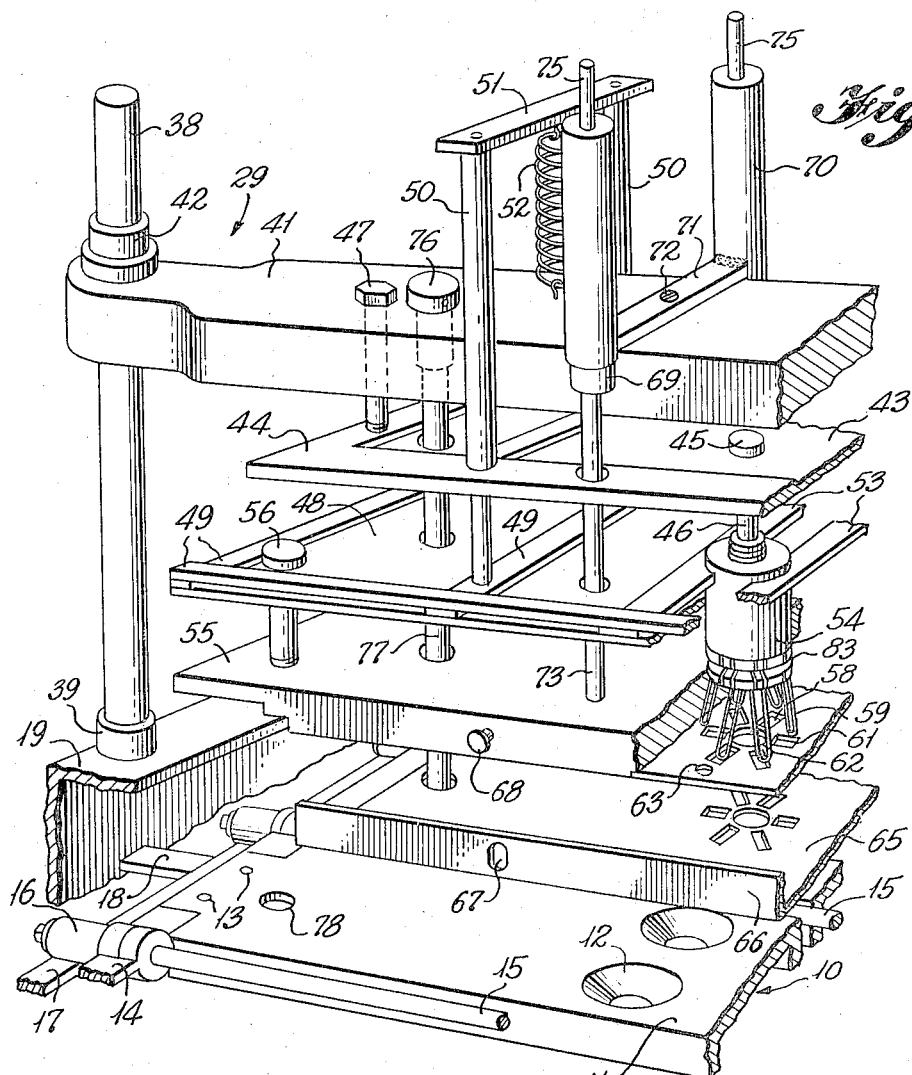
FIG. 2 is a diagrammatic perspective exploded view of part of the stoning head of the machine of FIG. 1, but drawn to an enlarged scale.
Figure 7:
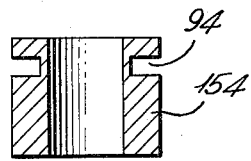
FIG. 7 is a cross section of the outer part of the cylinder which carries the fruit holding devices.
Figure 8:
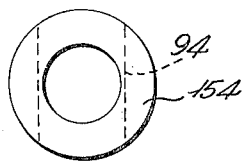
FIG. 8 is the plan view of the element shown in FIG. 7.
Figure 9:
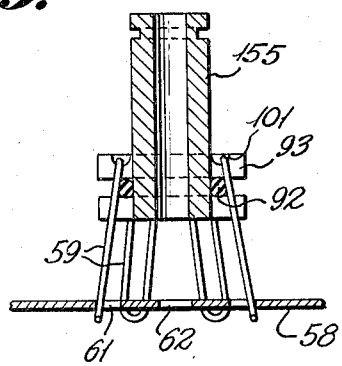
FIG. 9 is the inner part of the cylinder with the fruit holding elements mounted thereon.
Figure 10:
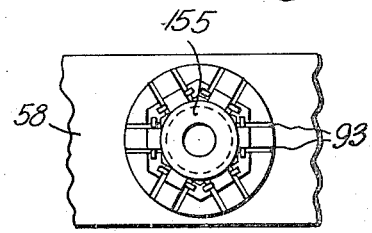
FIG. 10 is a plan view of the device shown in FIG. 9.
Figure 11:
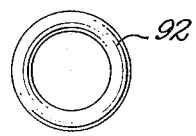
FIG. 11 is a plan view of the rubber expansion ring.
Figure 12:
FIG. 12 is a section of the ring shown in FIG. 11.
Figure 13:
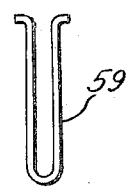
FIG. 13 is a perspective view of one of the jaw elements.

In the machine as illustrated, a conveyor belt generally indicated at 10 is formed by small plates 11 having fruit receiving pockets 12 which are open at the bottom and have sloping sides (see especially FIG. 2). The plates 11 are fixed by screws 13 to links 14 which are hinged on rods 15 running on rollers 16 along guide members 17. The guide members are connected by arms 18 to side members 19 of the machine frame 20 which upstands from a base 21 (FIG. 1). The conveyor belt 10 is advanced by toothed wheels or sprockets 22 and 23 which are mounted on shafts 24 and 25, respectively, and which are given intermittent rotary movement in the direction of the arrow F in FIG. 1. A charging hopper 27 serves to supply the pockets 12 with fruit 28 such as cherries which are carried by the conveyor belt 10 to a washing and brushing apparatus 34 and thence to an apparatus 35 which successively orientates the cherries in a manner known per se. The brushed, washed and orientated cherries are transported by the belt 10 until they reach a stoning head 29 which, when operated by rockers 30 mounted on supports 31 connected to the side members 19 of the machine frame, stones the cherries, the stones 32 being allowed to fall onto a discharge chute 33.

Upon continued movement of the conveyor 10, the plates 11 are caused to discharge the stoned cherries onto a discharge chute 36, whereafter said plates are advanced upside down along a guide 26 until they return to the charging hopper 27 where the pockets 12 may again be supplied with cherries from which the stones are to be removed.

A power unit (not shown) employing rotary members and chains or belts indicated generally by the reference numeral 37 in FIG. 1, causes the belt 10 and the head 29 to be driven alternately and intermittently such that the head 29 will be removing stones from the cherries when the belt 10 is stationary.

It will, however, be evident that the stoning head of the invention could be applied to stoning machines in which the conveyor belt moves continuously, but consequential modifications are then required to be made to the supports and to the transmission. The stoning head 29 will now be described in detail. It comprises a slide member 41 fitted with guide bushes 42 permitting displacement along posts 38 fitted with ferrules 39 and fixed to the side members 19 by means of nuts 40. The member 41 has a plate 43 with a raised edge 44 fixed to it by means of bolts 47, and the slide member and plate together carry extractor knives 46 having enlargements or heads 45 received between said member and plate.

The stoning head 29 further comprises a plate 48 fitted with reinforcing strips 49 and connected to stepped uprights 50. The larger diameter portions of the uprights bear on the plate 43 and are interconnected at their upper ends by cross members 51 which are anchored to the slide member 41 by tension springs 52. The plate 48 carries strips 53 engaging in slots 94 in the cylinders 54 of fruit-holding devices which will be described in greater detail hereinafter. Yet another plate 55 is attached to the plate 48 by means of bolts 56 and, in order to provide a seating for the fruit-holding devices, the plate 55 contains circular holes 57 which are covered at the bottom by plates 58 having circular guide apertures 62 for the passage of the respective knives 46 and rectangular apertures 61 for limiting the opening of U-shaped jaw elements 59 of the fruit-holding devices. The plates or covers 58 are fixed to the plate 55 by means of screws 64 inserted in the holes 63.

A fruit-separating plate 65 having upwardly bent flanges 66 is attached to the plate 55 by means of oval apertures 67 in the flanges engaging over studs 68 projecting from the plate 55. The separating plate 65 is provided with circular holes corresponding to the aforementioned apertures 62 and with rectangular apertures coresponding to the apertures 61, and having the same respective purposes.

Pairs of plungers 69 seated in cylinders 70 are connected to the slide member 41 by means of cross members 71 and screws 72. The plungers have stems 73 guided in holes in the plates 43 and 48 and push on the plate 55 under the action of springs 74 surrounding further stems 75 on the plungers.

Bolts 76 screwed into the slide 41 have cylindrical shanks 77 passing through bores disposed in the individual plates of the stoning head. They serve as guiding means for the various plates as the latter are displaced, and also as a means for locating the exact position of the plates 11 of the conveyor because, during the stoning phase of the machine operation, the shanks pass through holes 78 in the plates 11, and holes 79 in a cassette 80 which comprises rubber elements 81 and is secured to the side members 19 by means of arms 82.

The aforementioned fruit-holding devices each comprise the cylinder 54, which comprises the parts 154 and 155 and which part 155 receives one of the ejector knives 46 and carries fruit holders having U-shaped filiform jaw elements 59. The jaw elements have their upper ends bent over to form projections which are pivotally mounted in sockets 101 in projecting portions of the cylinder part 155. These jaw elements extend about the equatorial circumference of the fruit and tangentially thereto. The projecting portions of the part 155 further has vertical slots 93 to permit expansion of the jaw elements 59. These jaw elements are urged into the open position by a rubber ring 92 seated in a circular channel 83.

Whenever the conveyor plates 11 arrive under the head 29 as a result of the intermittent advancement of the conveyor, the cherries are to be stoned during the pause in advancement. The rocker 30 commences lowering of the slide 41 and consequently the shanks 77 of the bolts 76 enter the holes 78 in the small plates 11, thereby locating the pockets 12 so that they are concentric with the longitudinal axes of the knives 46, and the lower extremities of the jaw elements 59 of the fruit-holding device enter the upper portion of the pockets 12. All the elements fixed to the plates 48, 55 and 65, which are directly or indirectly affixed to the slide 41, descend under their own weight, whereby the plate 65 comes to rest on the plates 11. Subsequently, the plate 55 comes to bear on the plate 65, causing the studs 68 on the former to be projected into the apertures 67 in the flanges of the latter. As the slide 41 descends, the plate 48 comes to bear on the plate 55 whilst the springs 74 are compressed between the plungers 69 and the cylinders 70. In consequence, the lower ends of the knives 46 are passed through the holes 62 in the plates 58, engage in the corresponding guide holes in the plate 65 and reach the surface of the fruit 28 whilst still being guided inside sleeves. At the same time, the jaw elements 59 penetrate into the pockets 12 and, by reason of the conicity of the walls of the pockets, the jaw elements close and hold the fruit in a concentric position relatively to the longitudinal axes of the knives 46.

The pressure of the jaw elements 59 in each fruit-holding device and applied to the surface of the fruit ensures a sufficiently compact mass of pulp laterally of the stone to prevent the stone from slipping away sideways from the knife during ejection. This feature, in conjunction with the feature of guiding each knife in a housing until it reaches the surface of the fruit, makes it possible to use ejector knives of minimum thickness, resulting in negligible loss of pulp during the stoning process and the possibility of mechanically stoning small cherries, which was hitherto carried out manually in order to obviate the loss of pulp caused by the necessarily large thicknesses of the knives hitherto employed. When the slide 41 has been finally lowered until the plate 43 bears on the plate 48, the knives 46 will have penetrated the fruit and ejected the stones 32 which, due to friction against the rubber elements 81, are cleaned of any pulp which may have been ejected with them. At the same time, the shanks 77 have penetrated the bores 79 in the cassette 80 as the compression of the springs 74 is accentuated, and the springs 52 contract.

When the stones 32 have been expelled, the movements of the individual components of the head are repeated but in the opposite sequence, whereby the head, aided by the action of the springs 52 and 74, is returned to the positions shown in FIGS. 3 and 4. Advancement of the conveyor belt 10 is then resumed to carry the stoned fruit away from the head and introduce a fresh batch of fruit under the head for a further stoning operation.

I claim:

1. In a machine for stoning cherries and like fruit, a stoning head comprising ejector knives for the stones carried by a reciprocable plate, centrally apertured cylinders effective to sheath the ejector knives until said knives come into contact with the surface of the fruit and mounted on a plate which is freely suspended from said knife-carrying plate, a cylinder-receiving plate freely suspended from said cylinder-mounting plate, said cylinder-receiving plate comprising seatings for receiving said cylinders and apertured plates effective to guide said knives, a fruit-separating plate freely suspended from said cylinder-receiving plate, said fruit-separating plate being provided with apertures effective to guide said knives, and means effective to prevent lateral displacement of the stones whilst they are being ejected from the fruit.

2. The stoning head of claim 1, wherein said displacement preventing means for the stones comprise downwardly extending filiform U-shaped jaw elements having their upper ends bent about seatings provided in said cylinders, means for opening said jaw elements, means for restricting the amount of opening of said jaw elements and means for closing said jaws.

3. The stoning head of claim 2, wherein said jaw opening means comprise a rubber ring housed in a recess in which in each said cylinder below and adjacent said bent ends of said jaw elements and designed to cause the jaw elements to assume an upwardly converging disposition.

4. The stoning head of claim 2, wherein said restricting means for the jaw elements comprise apertures provided in said apertured guide plates and apertures provided in said fruit-separating plate.

5. The stoning head of claim 2, wherein said jaw closing means are constituted by the sides of said pockets.

References Cited by the Examiner

UNITED STATES PATENTS

| 1,024,564 | 4/1912 | Foote | 146—19 |
| 2,567,591 | 9/1951 | Ashlock | 146—19 |

FOREIGN PATENTS

| 603,598 | 4/1960 | Italy. |

WILLIAM W. DYER, Jr., *Primary Examiner.*

W. GRAYDON ABERCROMBIE, ROBERT C. RIORDON, *Examiners.*